(12) United States Patent
Sunwoo

(10) Patent No.: US 11,263,160 B2
(45) Date of Patent: Mar. 1, 2022

(54) APPARATUS AND METHOD FOR PERFORMING DATA TRANSMISSION WITH DOCKING DEVICE BY USING USB INTERFACE

(71) Applicant: Samsung Electronics Co., Ltd., Gyeonggi-do (KR)

(72) Inventor: Seung Hui Sunwoo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/767,262

(22) PCT Filed: Aug. 20, 2018

(86) PCT No.: PCT/KR2018/009526
§ 371 (c)(1),
(2) Date: May 27, 2020

(87) PCT Pub. No.: WO2019/117424
PCT Pub. Date: Jun. 20, 2019

(65) Prior Publication Data
US 2020/0327080 A1 Oct. 15, 2020

(30) Foreign Application Priority Data
Dec. 12, 2017 (KR) .......................... 10-2017-0170219

(51) Int. Cl.
*G06F 13/38* (2006.01)
*G06F 1/16* (2006.01)
*G06F 13/40* (2006.01)

(52) U.S. Cl.
CPC .......... *G06F 13/382* (2013.01); *G06F 1/1632* (2013.01); *G06F 13/4022* (2013.01); *G06F 2213/0042* (2013.01)

(58) Field of Classification Search
CPC ........ G06F 1/1632; G06F 1/189; G06F 13/38; G06F 13/382; G06F 13/4022; G06F 13/4081; G06F 1/266; G06F 2213/0042
(Continued)

(56) References Cited

U.S. PATENT DOCUMENTS 5,826,043 A * 10/1998 Smith .................... G06F 1/1632
710/303
7,240,208 B1 * 7/2007 Oakley ................. H04L 9/0897
348/207.99
(Continued)

FOREIGN PATENT DOCUMENTS

KR 10-2014-0112335 A 9/2014
KR 10-2016-0016485 A 2/2016
(Continued)

*Primary Examiner* — Faisal M Zaman
(74) *Attorney, Agent, or Firm* — Cha & Reiter, LLC

(57) ABSTRACT

An electronic device is disclosed. In addition, various embodiments identified through the specification are available. An electronic device disclosed in the disclosure includes a connector that is connected to a docking device, a first interface module supporting a display port protocol, a second interface module supporting a UFS protocol, a third interface module supporting a USB protocol, a switch located between the connector and the first interface module and the second interface module, a processor that controls the switch, and a memory electrically connected to the processor, wherein the memory stores instructions that, when executed by the processor, cause the processor to control the switch such that the first interface module is connected to the connector, receive a first signal requesting a change of an interface module from the docking device through the third interface module, and control the switch such that the second interface module is connected to the connector.

14 Claims, 12 Drawing Sheets

(58) Field of Classification Search
USPC .......................................... 710/303, 304, 15
See application file for complete search history.

(56) References Cited

U.S. PATENT DOCUMENTS

| | | | |
|---|---|---|---|
| 7,656,439 B1* | 2/2010 | Manico | H04N 1/00901 |
| | | | 348/231.3 |
| 9,343,837 B2 | 5/2016 | Moon | |
| 9,367,447 B2 | 6/2016 | Shacham et al. | |
| 9,429,992 B1* | 8/2016 | Ashenbrenner | G06F 13/4081 |
| 9,691,015 B2 | 6/2017 | Kwon et al. | |
| 10,042,783 B2 | 8/2018 | Park | |
| 10,366,029 B2 | 7/2019 | Lee et al. | |
| 2002/0051629 A1* | 5/2002 | Endo | H04N 1/00901 |
| | | | 386/289 |
| 2004/0128421 A1* | 7/2004 | Forbes | G06F 1/1632 |
| | | | 710/303 |
| 2005/0055601 A1* | 3/2005 | Wilson | G11B 15/68 |
| | | | 714/5.11 |
| 2005/0083247 A1* | 4/2005 | Juenger | G09G 5/006 |
| | | | 345/2.2 |
| 2005/0129385 A1* | 6/2005 | Speasl | H04N 5/907 |
| | | | 386/230 |
| 2006/0136646 A1* | 6/2006 | Do | H04W 8/005 |
| | | | 710/304 |
| 2009/0225190 A1* | 9/2009 | Fujinawa | H04N 1/00885 |
| | | | 348/231.2 |
| 2012/0099832 A1* | 4/2012 | Gupta | G11B 27/105 |
| | | | 386/230 |
| 2012/0159144 A1* | 6/2012 | Sengupta | H04B 1/3883 |
| | | | 713/100 |
| 2014/0208006 A1* | 7/2014 | Yun | G06F 13/382 |
| | | | 711/103 |
| 2014/0307165 A1* | 10/2014 | Chiba | H04N 21/43635 |
| | | | 348/441 |
| 2015/0143022 A1* | 5/2015 | Shacham | G06F 13/4068 |
| | | | 711/103 |
| 2015/0363121 A1* | 12/2015 | Jung | G06F 3/0617 |
| | | | 711/154 |
| 2016/0034413 A1* | 2/2016 | Park | G06F 13/4027 |
| | | | 710/105 |
| 2016/0034683 A1* | 2/2016 | Lee | G06F 21/6218 |
| | | | 726/17 |
| 2016/0062935 A1* | 3/2016 | Talmola | G06F 13/4027 |
| | | | 710/306 |
| 2016/0139936 A1 | 5/2016 | Sengupta et al. | |
| 2016/0259005 A1* | 9/2016 | Menon | G01R 31/31705 |
| 2016/0274821 A1* | 9/2016 | Park | G06F 13/102 |
| 2017/0235694 A1* | 8/2017 | Lee | G06F 13/4022 |
| | | | 710/106 |
| 2018/0113832 A1* | 4/2018 | Baek | G06F 13/4081 |

FOREIGN PATENT DOCUMENTS

| | | |
|---|---|---|
| KR | 10-2016-0112765 A | 9/2016 |
| KR | 10-1672172 B1 | 10/2016 |
| KR | 10-2017-0022373 A | 3/2017 |
| KR | 10-2017-0047808 A | 5/2017 |
| KR | 10-2017-0096510 A | 8/2017 |

* cited by examiner

APPARATUS AND METHOD FOR PERFORMING DATA TRANSMISSION WITH DOCKING DEVICE BY USING USB INTERFACE

CROSS REFERENCE TO RELATED APPLICATIONS

This application is a National Phase Entry of PCT International Application No. PCT/2018/009526, which was filed on Aug. 20, 2018, and claims a priority to Korean Patent Application No. 10-2017-0170219 which was filed on Dec. 12, 2017, the contents of which are incorporated herein by reference.

TECHNICAL FIELD

Embodiments disclosed in the disclosure relates to a device and a method for performing data transmission with a docking device using a universal serial bus (USB) interface.

BACKGROUND ART

A docking device may perform an interface function that transmits data between a portable device, such as a mobile phone or a tablet PC, and a display device (e.g., a TV or a desktop computer). For example, the docking device may convert video data transmitted from the portable device into a format supported by the display device.

DISCLOSURE

Technical Problem

As contents used through a docking device and a demand of a user increase, a high-speed memory capable of supporting a faster data processing speed is required. When a separate connector is inserted in a portable device to use the high-speed memory added in the docking device, a mounting space in the portable device may be reduced.

Various embodiments of the disclosure are to propose a device and a method for performing data transmission between an electronic device and the docking device using the high-speed memory added in the docking device.

Technical Solution

An aspect of the disclosure provides an electronic device including a connector that is connected to a docking device, a first interface module supporting a display port protocol, a second interface module supporting a universal flash storage (UFS) protocol, a third interface module supporting a universal serial storage (USB) protocol, a switch located between the connector and the first interface module and the second interface module, a processor that controls the switch, and a memory electrically connected to the processor, wherein the memory stores instructions that, when executed by the processor, causes the processor to control the switch such that the first interface module is connected to the connector, receive a first signal requesting a change of an interface module from the docking device through the third interface module, and control the switch such that the second interface module is connected to the connector Another aspect of the disclosure provides a docking device including a connector that is connected to an electronic device, a first interface module supporting a DP protocol, a processor, and a switch located between the first interface module and the connector, wherein the processor detects that a memory including a UFS interface module is inserted into the docking device, transmits a first signal requesting a change of an interface module of the electronic device, receives a first response signal in response to the first signal from the electronic device, and controls the switch such that the UFS interface module is connected to the connector.

Another aspect of the disclosure provides an electronic device including a USB connector that is connected to a docking device and includes a USB C-TYPE, a first interface module supporting a DP protocol, a second interface module supporting a UFS protocol, a third interface module supporting a USB protocol, a switch located between the connector and the first interface module and the second interface module, a processor that controls the switch, and a memory electrically connected to the processor, wherein the memory stores instructions that, when executed by the processor, causes the processor to control the switch such that the first interface module is connected to the USB connector, receive a first signal requesting a change of an interface module from the docking device through the third interface module, and control the switch such that the second interface module is connected to the USB connector.

Advantageous Effects

According to embodiments disclosed in the disclosure, the electronic device performs data transmission based on a high-speed memory between the electronic device and the docking device through a universal serial bus (USB) interface, so that a data processing speed may be increased and a reduction of a mounting space of the electronic device may be prevented.

In addition, according to embodiments disclosed in the disclosure, the electronic device and the docking device may provide a user with a system environment supporting a plurality of operating systems by performing the data transmission based on the high-speed memory.

In addition, various effects that may be directly or indirectly identified through the disclosure may be provided.

DESCRIPTION OF DRAWINGS

In the description of the drawings, the same or similar reference numerals may be used for the same or similar components.

MODE FOR INVENTION

Hereinafter, various embodiments of the disclosure will be described with reference to accompanying drawings. Various embodiments of the disclosure used herein are not intended to limit the disclosure to specific embodiments, and it should be understood that the embodiments include modification, equivalent, and/or alternative on the corresponding embodiments described herein.

Figure 1:
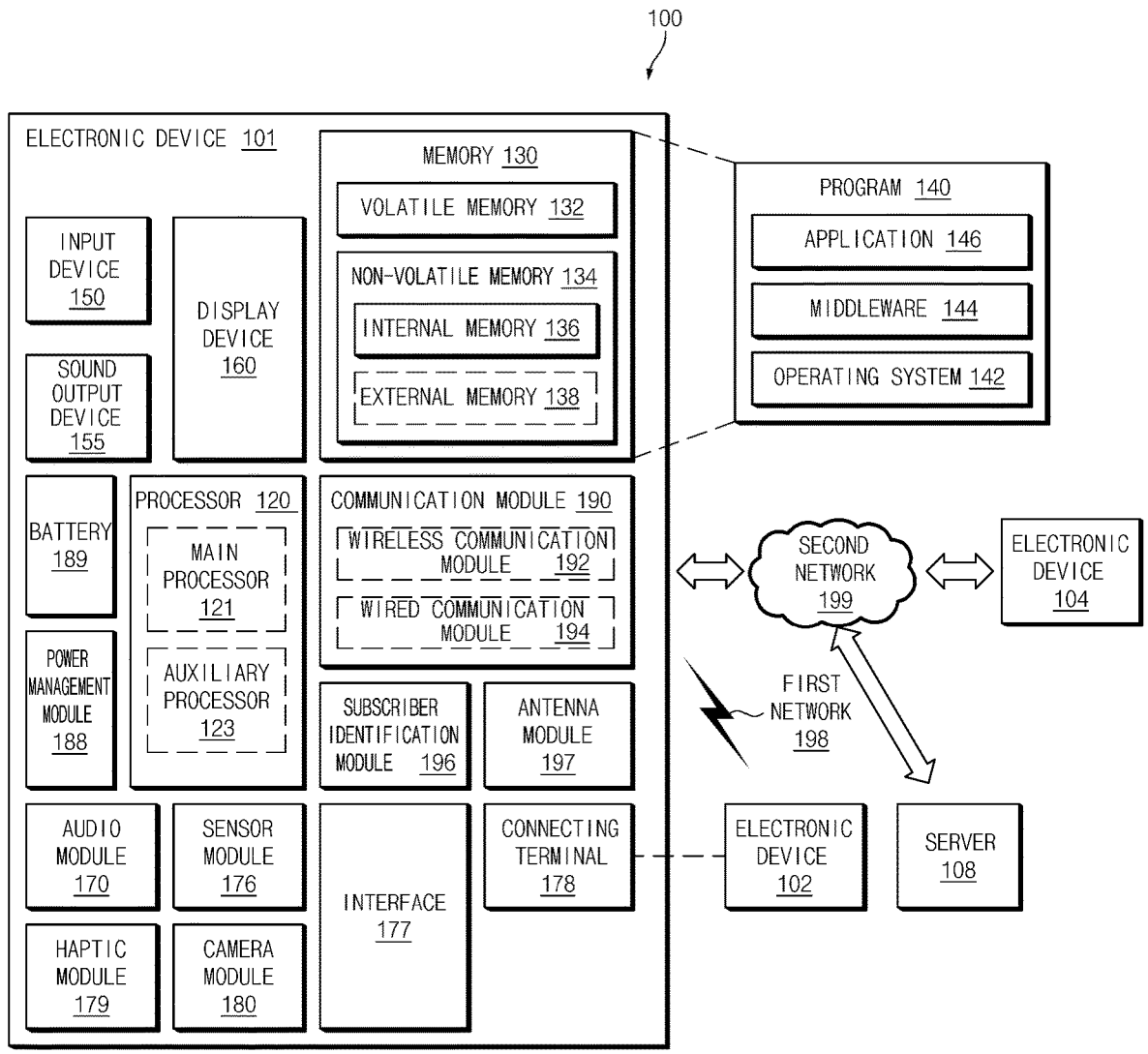
FIG. 1 is a block diagram of an electronic device in a network environment according to various embodiments.

FIG. 1 is a block diagram of an electronic device in a network environment according to various embodiments.

Referring to FIG. 1, an electronic device 101 may communicate with an electronic device 102 through a first network 198 (e.g., a short-range wireless communication) or may communicate with an electronic device 104 or a server 108 through a second network 199 (e.g., a long-distance wireless communication) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) among components of the electronic device 101 may be omitted or other components may be added to the electronic device 101. According to some embodiments, some components may be integrated and implemented as in the case of the sensor module 176 (e.g., a fingerprint sensor, an iris sensor, or an illuminance sensor) embedded in the display device 160 (e.g., a display).

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121, additionally or alternatively uses less power than the main processor 121, or is specified to a designated function. In this case, the auxiliary processor 123 may operate separately from the main processor 121 or embedded.

In this case, the auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, or a keyboard.

The sound output device 155 may be a device for outputting a sound signal to the outside of the electronic device 101 and may include, for example, a speaker used for general purposes, such as multimedia play or recordings play, and a receiver used only for receiving calls. According to an embodiment, the receiver and the speaker may be either integrally or separately implemented.

The display device 160 may be a device for visually presenting information to the user of the electronic device 101 and may include, for example, a display, a hologram device, or a projector and a control circuit for controlling a corresponding device. According to an embodiment, the display device 160 may include a touch circuitry or a pressure sensor for measuring an intensity of pressure on the touch.

The audio module 170 may convert a sound and an electrical signal in dual directions. According to an embodiment, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102), for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to an embodiment, the camera module 180 may include, for example, at least one lens, an image sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include, for example, a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the wired communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module) and may communicate with the external electronic device using a corresponding communication module among them through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules 190 may be implemented into one chip or into separate chips, respectively.

According to an embodiment, the wireless communication module 192 may identify and authenticate the electronic device 101 using user information stored in the subscriber identification module 196 in the communication network.

The antenna module 197 may include one or more antennas to transmit or receive the signal or power to or from an external source. According to an embodiment, the communication module 190 (e.g., the wireless communication module 192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, for example, a cloud computing, distributed computing, or client-server computing technology may be used.

Figure 2:
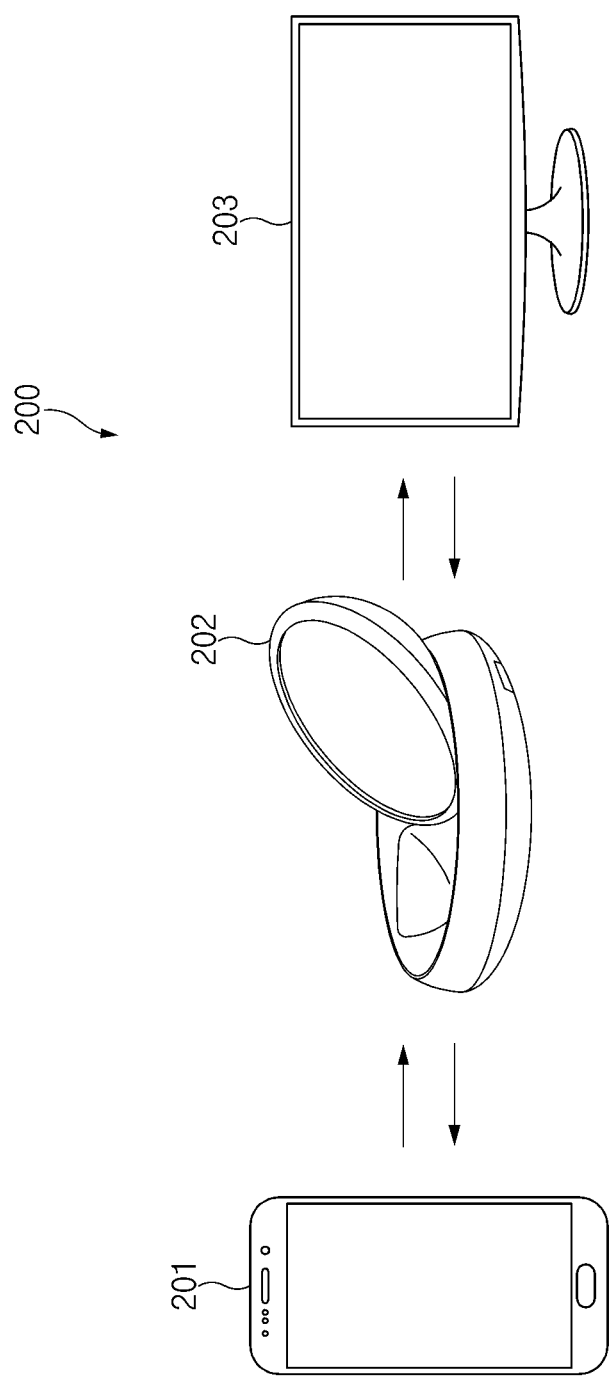
FIG. 2 illustrates a network environment using a docking device according to various embodiments.

FIG. 2 illustrates a network environment using a docking device according to various embodiments.

Referring to FIG. 2, a network 200 (e.g., the first network 198 in FIG. 1) may include a first electronic device 201, a docking device 202, and a second electronic device 203. Each of the first electronic device 201 and the second electronic device 203 may include components equal to or similar to the components of the electronic device 101 of FIG. 1. The first electronic device 201 and the second electronic device 203 may be connected with each other through the docking device 202.

According to an embodiment, the first electronic device 201 may be a portable electronic device such as a smart phone, a tablet PC, and a wearable device. The first electronic device 201 may transmit data stored in the first electronic device 201 to the docking device 202. For example, the first electronic device 201 may transmit video or audio data to the docking device 202 using a USB protocol defined by a USB standard organization (USB.org) or a protocol other than the USB protocol (which may be referred to as a non-USB protocol). The USB protocol may include, for example, a version 2.0 or a version 3.x (which means a version 3.0 or higher). The non-USB protocol may include, for example, a display port (DP) protocol defined by a video electronics standards association (VESA), and a universal flash storage (UFS) protocol defined by a joint electron device engineering council (JEDEC).

According to an embodiment, the docking device 202 may convert the data received from the first electronic device 201 based on a standard supported by the second electronic device 203. For example, the docking device 202 may convert the video or audio data received using the DP protocol into data conforming to a high definition multimedia interface (HDMI) protocol. The docking device 202 may transmit the converted data to the second electronic device 203.

According to an embodiment, the second electronic device 203 may be a display device such as a monitor or a TV. The second electronic device 203 may receive the video or audio data from the docking device 202. The second electronic device 203 may play the received data in real time.

Figure 3:
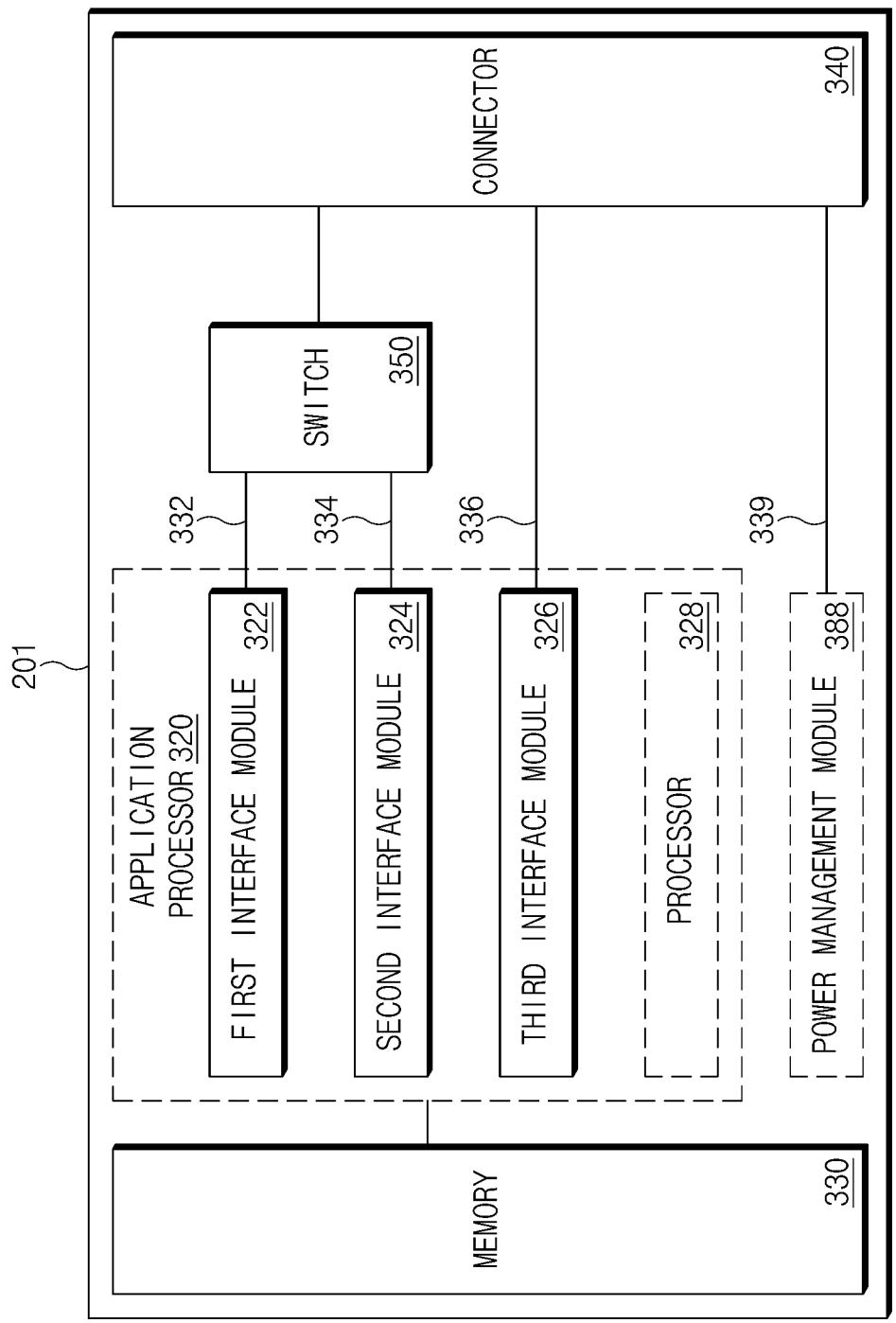
FIG. 3 illustrates a configuration of an electronic device according to various embodiments.

FIG. 3 illustrates a configuration of an electronic device according to various embodiments.

Referring to FIG. 3, the first electronic device 201 may include an application processor 320 (e.g., the processor 120 of FIG. 1), a memory 330 (e.g., the memory 130 of FIG. 1), and a connector 340 (e.g., the connecting terminal 178 of FIG. 1), and a switch 350. According to various embodiments, the first electronic device 201 may omit at least some of the components illustrated in FIG. 3. For example, the first electronic device 201 may not include at least one of the application processor 320 and a processor 328.

According to an embodiment, the application processor 320 may include a first interface module 322, a second interface module 324, a third interface module 326, and the processor 328. Although not shown in FIG. 3, the application processor 320 may further include a module in a form of software or hardware to perform data format conversion, data compression, data encryption, or data multiplexing of data loaded from the memory 330.

According to an embodiment, each of the interface modules may transmit the data to the connector 340 based on a USB or a non-USB protocol standard. In various embodiments, the first interface module 322, the second interface module 324, and the third interface module 326 may support different protocols. For example, the first interface module 322 may support the USB 3.x protocol, the second interface module 324 may support the UFS protocol, and the third interface module 326 may support the USB 2.0 protocol. For another example, the first interface module 324 may support the DP protocol or support the USB 3.x protocol and the DP protocol together. Each interface module may include a physical transceiver (PHY) that physically transmits the data to the connector 340 and a controller that controls the PHY. Each of the PHYs may be connected to the connector 340 through a lane.

According to an embodiment, the processor 328 may control data transmission of each interface module. The processor 328 may be, for example, a central processing unit (CPU) embedded in the application processor 320 separately from the interface modules. In another example, the processor 328 may be a controller embedded in at least one of the interface modules. The processor 328 may be a module in a form of hardware or software.

According to an embodiment, the memory 330 may be a non-volatile memory or a volatile memory. When the memory 330 is the non-volatile memory, the memory 330 may be a flash memory. For example, the memory 330 may include an embedded multimedia card (eMMC), a UFS, or a secure digital card (SD card). When the memory 330 is the non-volatile memory, the memory 330 may be a random access memory (RAM). According to an embodiment, the memory 330 may include a software driver used by each interface module to convert the data. According to an embodiment, the memory 330 may include instructions used by the processor 328 to control data transmission of each interface module. According to an embodiment, the memory 330 may include at least one operating system.

According to an embodiment, the connector 340 may be physically connected to a connector of the docking device 202. The connector 340 may transmit the data transmitted from the application processor 320 to the connector of the docking device 202. The connector 340 may support the USB protocol or the non-USB protocol, or both the USB protocol and the non-USB protocol. For example, the connector 340 may include a USB C-TYPE defined by the USB standard organization.

According to an embodiment, the switch 350 may be located between the first interface module 322, the second interface module 324, and the connector 340. The switch 350 may connect one of the first interface module 322 and the second interface module 324 with the connector 340 under control of the processor 328. Although FIG. 3 illustrates an analog type switch 350, the first electronic device 201 may include a digital switch inside the application processor 320 without including the switch 350.

According to an embodiment, the first interface module 322 and the second interface module 324 may transmit the data respectively through a first lane 332 and a second lane 334. For example, when the connector 340 includes the USB C-TYPE, each of the first lane 332 and the second lane 334 may include one of a TX1+/− lane and a TX2+/− lane, and one of a RX1+/− lane and a RX2+/− lane. According to an embodiment, the first lane 322 may further include a lane for transmitting the audio data conforming to the DP protocol. According to an embodiment, the second lane 324 may further include a lane for performing an initialization process of the UFS memory. According to an embodiment, the third interface module 326 may transmit the data through a third lane 336. The third lane 336 may include, for example, a D+/− lane.

According to an embodiment, the application processor 320 may load the data stored in the memory 330, convert the loaded data into a signal in a format that may be supported by the connector using the USB protocol (or the non-USB protocol), and transmit the converted signal to the docking device 202 through the connector 340. According to an embodiment, the processor 328 may receive a signal of requesting a change of the interface module from the docking device 202 through the third interface module 326, and may control the switch 350 such that one of the first interface module 322 and the second interface module 324 is connected to the connector 340. When the first interface module 322 is connected to the connector 340, the processor 328 may transmit the data to the docking device 202 using the protocol (e.g., the USB 3.x protocol or the DP protocol) supported by the first interface module. When the second interface module 324 is connected to the connector 340, the processor 328 may transmit the data to the docking device 202 using the protocol (e.g., the UFS protocol) supported by the second interface module 324.

According to an embodiment, the first electronic device 201 may further include a power management module 388 (e.g., the power management module 188 of FIG. 1). According to an embodiment, the power management module 388 may supply power to the docking device 202 through the connector 340. The power management module 388 may be connected to the connector 340 through a fourth lane 339. For example, when the connector 340 includes the USB C-TYPE, the fourth lane 339 may include a VBUS lane.

According to an embodiment, the processor 328 may transmit a control signal to the power management module 388 through an inter-integrated circuit (I2C) or a GPIO. For example, the processor 328 may transmit a signal that controls the power management module 388 to supply the power to the docking device 202 to the power management module 388.

Figure 4:
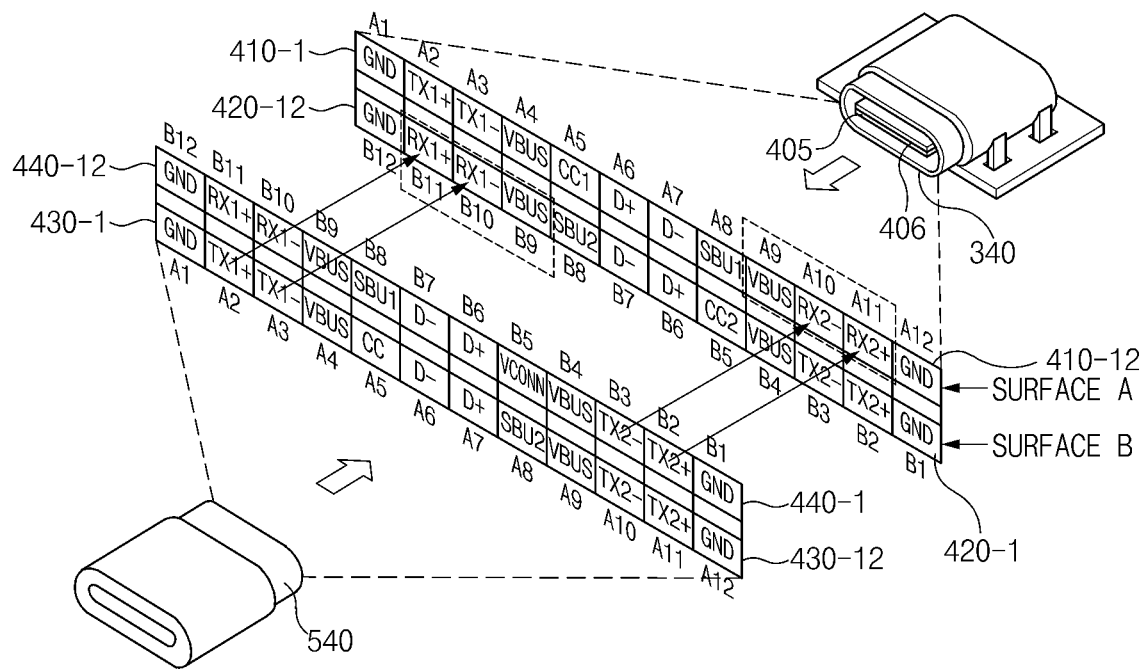
FIG. 4 illustrates configurations of a connector of an electronic device and a connector of a docking device according to various embodiments.

FIG. 4 illustrates configurations of a connector of an electronic device and a connector of a docking device according to various embodiments.

Referring to FIG. 4, the first electronic device 201 according to various embodiments may be electrically connected to the docking device 202 through the connector 340. The connector 340 of the first electronic device 201 may have an outer shape, which allows a connector 540 of the docking device 202 to be plugged in either a forward or a reverse direction (hereinafter, which may be referred to as a reversible), and a contact substrate 405 may be formed inside the connector 340. The contact substrate 405 may have twelve pins 410-1, 410-2, . . . , 410-12 formed on a first surface (e.g., a surface A) corresponding to the forward direction, and may have twelve pins 420-1, 420-2, . . . 420-12 formed on a second surface (e.g., a surface B) corresponding to the reverse direction. A mid plate 406 having an electrically conductive property may be formed inside the contact substrate 405. The connector 540 of the docking device 202 may have twelve pins 430-1, 430-2, . . . 430-12 formed on a first surface (e.g., a surface A) to be respectively in contact with the twelve pins 410-1, 410-2, . . . 410-12 formed on the first surface (e.g., the surface A) of the contact substrate 405, and may have twelve pins 440-1, 440-2, . . . 440-12 formed on a second surface (e.g., a surface B) to be respectively in contact with the twelve pins 420-1, 420-2, . . . 420-12 formed on the second surface (e.g., the surface B) of the contact substrate 405. The number of pins formed in the connector 540 of the docking device 202 may vary depending on a type of the docking device 202. One or two CC pins of the docking device 202 may be included depending on the type of the docking device 202. For example, an arrangement order of the twelve pins formed on the first surface (e.g., the surface A) may be the same as an arrangement order of the twelve pins formed on the second surface (e.g., the surface B) such that the connector 540 of the docking device 202 may be plugged in either direction of the first surface or the second surface. Because of such structure, the user may plug a cable of the docking device 202 into the connector 340 of the first electronic device 201 in a state of being rotated 180 degrees.

According to an embodiment, arrangement of the pins formed on the first surface (e.g., the surface A) and the second surface (e.g., the surface B) of the contact substrate 405 is as shown in [Table 1] below.

TABLE 1

| Pin No. | Pin No. | Signal Name | Function | Note |
|---|---|---|---|---|
| A1 | B1 | GND | Power | Ground (e.g. Support for 60 W minimum (combined with all VBUS pins)) |
| A2 | B2 | TX1+ or SSTXp1 | USB 3.1 or Alternate Mode | Super speed TX positive (e.g., 10 Gb/s differential pair with TX1-) |
| A3 | B3 | TX1- or SSTXn1 | USB 3.1 or Alternate Mode | Supper speed TX negative (e.g. 10 Gb/s differential pair with TX1+) |
| A4 | B4 | VBUS | Power | USB cable charging power (e.g., Support for 60 W minimum (combined with all VBUS pins)) |
| A5 | B5 | CC1, CC2 | CC or VCONN | Identification terminal |
| A6 | B6 | D+ | USB 2.0 | +line of the differential bi-directional USB signal |
| A7 | B7 | D- | USB 2.0 | -line of the differential bi-directional USB signal |

TABLE 1-continued

| Pin No. | Pin No. | Signal Name | Function | Note |
|---|---|---|---|---|
| A8 | B8 | SBU1, SBU2 | Alternate Mode | Side band Use: additional purpose pin (e.g., Audio signal, display signal, and the like) |
| A9 | B9 | VBUS | Power | USB cable charging power (e.g., Support for 60 W minimum (combined with all VBUS pins) |
| A10 | B10 | RX2- or SSRXn2 | USB 3.1 or Alternate Mode | Super speed RX negative (e.g., 10 Gb/s differential pair with RX2+) |
| A11 | B11 | RX2+ or SSRXp2 | USB 3.1 or Alternate Mode | Super speed RX negative (e.g., 10 Gb/s differential pair with RX2-) |
| A12 | B12 | GND | Power | Ground (e.g., Support for 60 W minimum (combined with all VBUS pins)) |

Referring to [Table 1], a description of the pins of the connector 340 of the USB C-TYPE according to various embodiments is achieved. The connector 340 of the USB C-TYPE includes the 12 pins (terminals) on each of the first surface (e.g., the surface A) and the second surface (e.g., the surface B). The 12 pins on the first surface (e.g., the surface A) may include GND(A1), TX1+ (A2), TX1-(A3), VBUS (A4), CC1(A5), D+(A6), D-(A7), SBU1(A8), VBUS(A9), RX2-(A10), RX2+(A11), and GND(A12). The 12 pins on the second surface (e.g., the surface B) may include GND (B1), TX2+(B2), TX2-(B3), VBUS(B4), CC2 (or VCONN) (B5), D+(B6), D-(B7), SBU2(B8), VBUS(B9), RX1- (B10), RX1+ (B11), and GND(B12).

Because of the reversibility, in the connector 340 of the USB C-TYPE, the 24 pins formed on the first and the second surfaces may be arranged in a mirrored configuration. Because of such structure, the user may rotate the connector 540 of the docking device 202 180 degrees and mount the connector 540 of the docking device 202 to the connector 340 of the first electronic device 201. In this case, symmetrical pins may not be used together. For example, when the TX1+ and the TX1- are used, the TX2+, the TX2-, the RX2+, and the RX2- may not be used, Further, when the RX1+ and the RX1- are used, the RX2+, the RX2-, the TX2+, and the TX2- may not be used. The electrically conductive mid plate 406 may be included inside the contact substrate 405 of the connector 340. A total of 24 (e.g., 12 on the first surface and 12 on the second surface) pins exist on the contact substrate 405, but the corresponding pins may not be used at the same time. Which pin to be used may be determined based on a connection state of the cable to be connected, a connector attached to an end of the cable, and the connector 340 of the first electronic device 201 connected to the connector.

According to an embodiment, the CC1 pin 410-5 formed on the first surface (e.g., the surface A) of the contact substrate 305 and the CC2 pin 420-5 formed on the second surface (e.g., the surface B) may be used to identify a purpose of the docking device 202 connected to the connector 340. For example, when the connector 540 of the docking device 202 is plugged into the connector 340 of the first electronic device 201 such that the first surface (e.g., the surface A) of the connector 540 is directed upward, and when the CC1 pin 410-5 of the first electronic device 201 is connected to the CC pin 430-5 of the docking device 202, the CC2 pin 420-5 of the first electronic device 201 may be used to supply power (VCONN) for an IC for recognizing the docking device 202. When the connector 540 of the docking device 202 is plugged into the connector 340 of the first electronic device 201 such that the first surface (e.g., the surface A) of the connector 540 is directed downward, and when the CC2 pin 420-5 of the first electronic device 201 is connected to the CC pin 430-5 of the docking device 202, the CC1 pin 410-5 of the first electronic device 201 may be used to supply the power (VCONN) for the IC for recognizing the docking device 202. Such CC pins 410-5 and 420-5 of the first electronic device 201 may be connected to the CC or the VCONN of the docking device 202, and the CC pins 410-5 and 420-5 of the first electronic device 201 may support the CC and the VCONN.

According to an embodiment, the SBU1 pin 410-8 and the SBU2 pin 420-8 are low-speed signal pins allocated to be used in an alternate mode. Prior to transmitting and receiving the power, negotiation of such alternate mode between the first electronic device 201 and the docking device 202 may be required. According to an embodiment, the SBU 1 pin 410-8 and the SBU 2 pin 420-8 may be used to perform the initialization process of the UFS memory.

According to an embodiment, when the first electronic device 201 receives the data from the docking device 202 connected to the connector 340, the pins of the VBUS(A4), the RX2−(A10), the RX2+(A11), and the GND(A1 and A12) of the first surface (e.g., the surface A) may be respectively connected to the pins of the VBUS(A4), the TX1+ (A2), the TX1−(A3), the GND(A1 and A12) of the first surface (e.g., the surface A) or to the pins of the VBUS(B4), the TX2+ (B2), the TX2−(B3), and the GND(A1 and A12) of the second surface (e.g., the surface B) of the connector 540 of the docking device 202.

According to an embodiment, the TX1+, the TX1−, the TX2+, the TX2−, the RX2+, the RX2−, the RX1+, and the RX1− may support the DP protocol, the UFS protocol, or the USB 3.0 protocol in addition to the USB 3.1 protocol.

Figure 5:
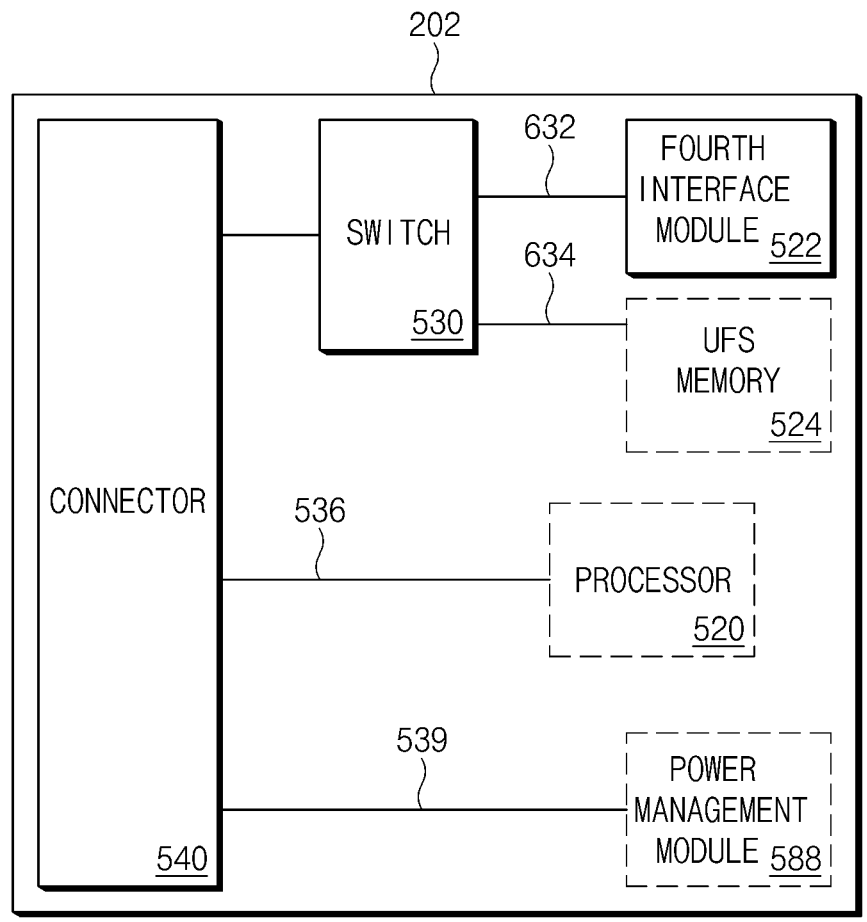
FIG. 5 illustrates a configuration of a docking device according to various embodiments.

FIG. 5 illustrates a configuration of a docking device according to various embodiments.

Referring to FIG. 5, the docking device 202 may include a processor 520 (e.g., the processor 120 in FIG. 1), a switch 530, the connector 540 (e.g., the connecting terminal 178 in FIG. 1), a fourth interface module 522, and a UFS memory 524.

According to an embodiment, the connector 540 may be physically connected to the connector 340 of the first electronic device 201. The connector 540 may support the USB protocol or the non-USB protocol, or may support the USB protocol and the non-USB protocol. For example, the connector 540 may include the USB C-TYPE.

According to an embodiment, the fourth interface module 522 may process data based on the USB or the non-USB protocol standard. For example, the fourth interface module 522 may convert the received data using the DP protocol into data conforming to the HDMI protocol. The fourth interface module 522 may include a PHY that physically receives data from the connector 540, and a controller that controls the PHY. The PHY may be connected to the connector 540 through a lane.

According to an embodiment, the UFS memory 524 may be in a form of being embedded in the docking device 202, or may be in a form of a card that may be inserted and removed. When the UFS memory 524 is inserted into the docking device 202, the UFS memory 524 may be connected to the connector 540. The UFS memory 524 may be a flash memory. According to an embodiment, the UFS memory 524 may include a software driver used by the fourth interface module 522 to convert the data. According to an embodiment, the UFS memory 524 may include an interface module that supports the UFS protocol. The interface module included in the UFS memory 524 may include the PHY and the controller. The UFS memory 524 may convert the data based on the UFS protocol using the interface module.

According to an embodiment, the processor 520 may control data transmission of each of the fourth interface module 522 and the UFS memory 524. The processor 520 may be a separate micro controller unit (MCU) or a controller embedded in the fourth interface module 522. The processor 520 may be a module in a form of hardware or software. According to an embodiment, the processor 520 may support the USB 2.0 protocol. For example, the processor 520 may transmit a signal based on the USB 2.0 to the first electronic device 201 through the connector 540.

According to an embodiment, the switch 530 may be located between the fourth interface module 522, the UFS memory 524, and the connector 540. The switch 530 may connect one of the fourth interface module 522 and the UFS memory 524 with the connector 540 under control of the processor 520.

According to an embodiment, the fourth interface module 522 and the UFS memory 524 may receive the data respectively through the fifth lane 532 and the sixth lane 534. For example, when the connector 540 includes the USB C-TYPE, each of the fifth lane 532 and the sixth lane 534 may include one of the TX1+/− lane and the TX2+/− lane, and one of the RX1+/− lane and the RX2+/− lane. According to an embodiment, the fifth lane 532 may further include a lane for performing an initialization process of the UFS memory 524. According to an embodiment, the processor 520 may transmit and receive the data through a seventh lane 536. The seventh lane 536 may include, for example, the D+/− lane.

According to an embodiment, when the UFS memory 524 is inserted into the docking device 202, the processor 520 may transmit the data to the first electronic device 201 through the UFS protocol. For example, when UFS memory 524 is detected, the processor 520 may transmits a signal requesting a change of the interface module to the first electronic device 201 through the seventh lane 536, and may control the switch 530 such that one of the fourth interface module 522 and the UFS memory 524 is connected to the connector 540. When the fourth interface module 522 is connected to the connector 540, the processor 520 may receive the data using the protocol (e.g., the USB 3.x protocol or the DP protocol) supported by the fourth interface module 522. When the UFS memory 524 is connected to the connector 540, the processor 520 may receive the data using the UFS protocol.

According to an embodiment, the docking device 202 may further include a power management module 588 (e.g., the power management module 188 of FIG. 1). When the docking device 202 further includes the power management module 588, the processor 520 may be embedded in the power management module 588. According to an embodiment, the power management module 588 may be supplied with power from the first electronic device 201 through the connector 540. The power management module 588 may be connected to the connector 540 through an eighth lane 539. For example, when the connector 540 includes the USB C-TYPE, the eighth lane 539 may include the VBUS lane.

According to an embodiment, the power management module 588 may supply the power to the UFS memory 524. The processor 520 may control the power supply of the power management module 588 through the I2C or the GPIO.

Figure 6:
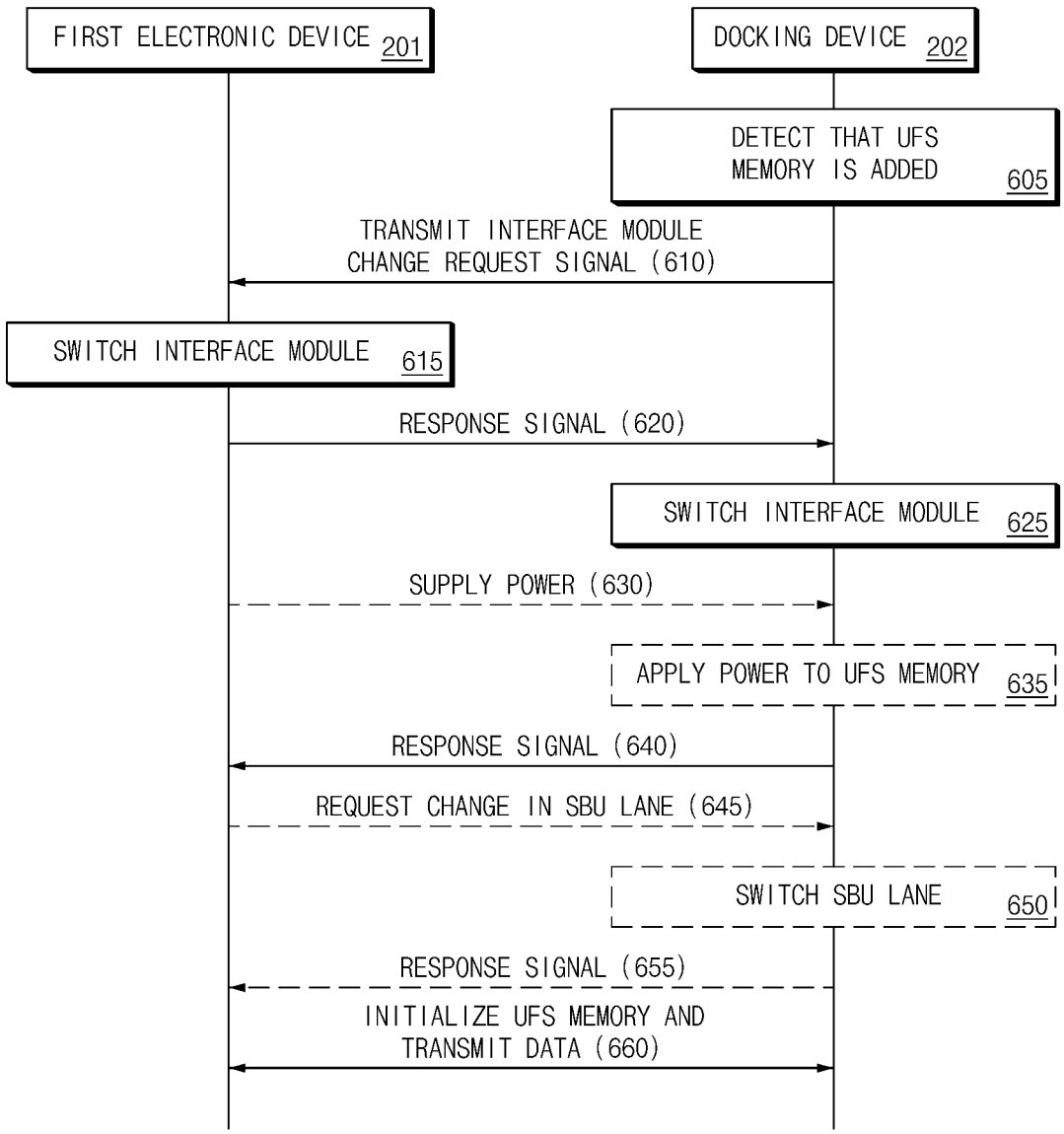
FIG. 6 illustrates a signal flow diagram between an electronic device and a docking device when a universal flash storage (UFS) memory is inserted in the docking device according to various embodiments.

FIG. 6 illustrates a signal flow diagram between an electronic device and a docking device when a universal flash storage (UFS) memory is inserted in the docking device according to various embodiments.

Figure 8:
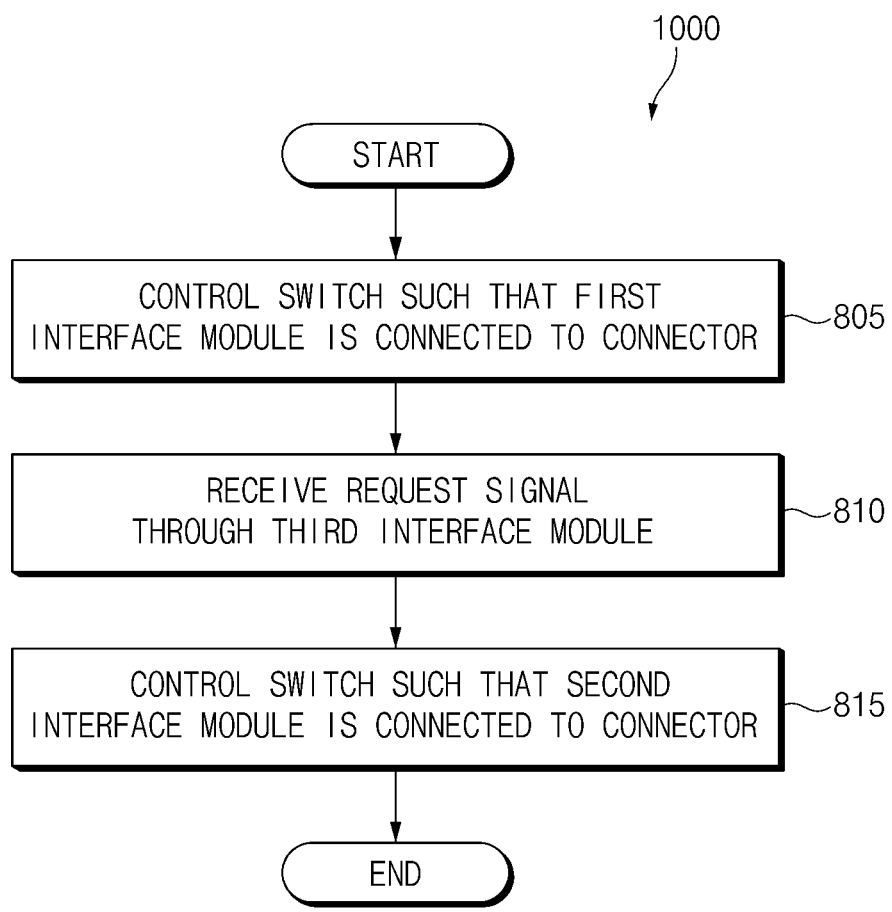
FIG. 8 illustrates an operation flowchart of an electronic device switching an interface module connected to a connector according to various embodiments.

Referring to FIG. 6, the first electronic device 201 and the docking device 202 may be physically connected with each other through the connectors. FIG. 8 may assume an environment in which the first electronic device 201 and the docking device 202 may perform data transmission through a legacy protocol. The legacy protocol may include, for example, the USB protocol or the DP protocol.

In operation 605, the docking device 202 may detect that the UFS memory 524 is added in the docking device 202. When the UFS memory 524 is in a form of an external card that may be inserted and removed, the docking device 202 may detect that the UFS memory 524 is added through a card detection (CD) signal.

In operation 610, the docking device 202 may transmit a first signal requesting a change of the interface module to the first electronic device 201. For example, the docking device 202 may request to change the interface from an interface module supporting the legacy protocol to an interface module supporting the UFS protocol. According to an embodiment, the docking device 202 may transmit the first signal through the USB 2.0 protocol.

In operation 615, the first electronic device 201 may switch the interface module. For example, the first electronic device 201 may switch the interface module from the first interface module 322 supporting the legacy protocol to the second interface module 324 supporting the UFS protocol. According to an embodiment, the first electronic device 201 may change the interface module by controlling the switch 350 located between the application processor 320 and the connector 340. According to an embodiment, the first electronic device 201 may change the interface module by controlling a digital signal inside the application processor 320.

In operation 620, the first electronic device 201 may transmit a first response signal in response to the first signal. For example, the first electronic device 201 may transmit the first response signal using the USB 2.0 protocol.

In operation 625, the docking device 202 may switch the interface module. For example, the docking device 202 may switch the interface module from the fourth interface module 522 supporting the legacy protocol to a UFS interface module (which may be included in the UFS memory 524) supporting the UFS protocol.

In operation 630, the first electronic device 201 may supply the power to the docking device 202 through the power management module 388. In operation 635, the docking device 202 may apply power to the UFS memory 524 using the supplied power.

In operation 640, the docking device 202 may transmit a re-response signal indicating that the interface module has been switched to the first electronic device 201. For example, the docking device 202 may transmit the re-response signal using the USB 2.0 protocol.

In operation 645, the first electronic device 201 may detect that an insertion direction of the connector is changed, and may transmit a second signal requesting a change in an SBU lane used to initialize the UFS memory to the docking device 202. For example, the first electronic device 201 may transmit the second signal using the USB 2.0 protocol.

In operation 650, the docking device 202 may switch the SBU lane. For example, the docking device 202 may switch the SBU lane by controlling another switch located between the UFS memory 524 and the connector 540.

In operation 655, the docking device 202 may transmit a second response signal indicating that the SBU lane has been switched to the first electronic device 201. For example, the docking device 202 may transmit the second response signal using the USB 2.0 protocol.

In operation 660, the first electronic device 201 and the docking device 202 may initialize the UFS memory and perform the data transmission using the UFS protocol. Through the above-described method, even when the UFS memory is inserted into the docking device 202, each of the first electronic device 201 and the docking device 202 may switch the interface module to the interface module supporting the UFS protocol using the connector (e.g., the USB connector) that is already embedded therein without adding an additional connector.

Figure 7:
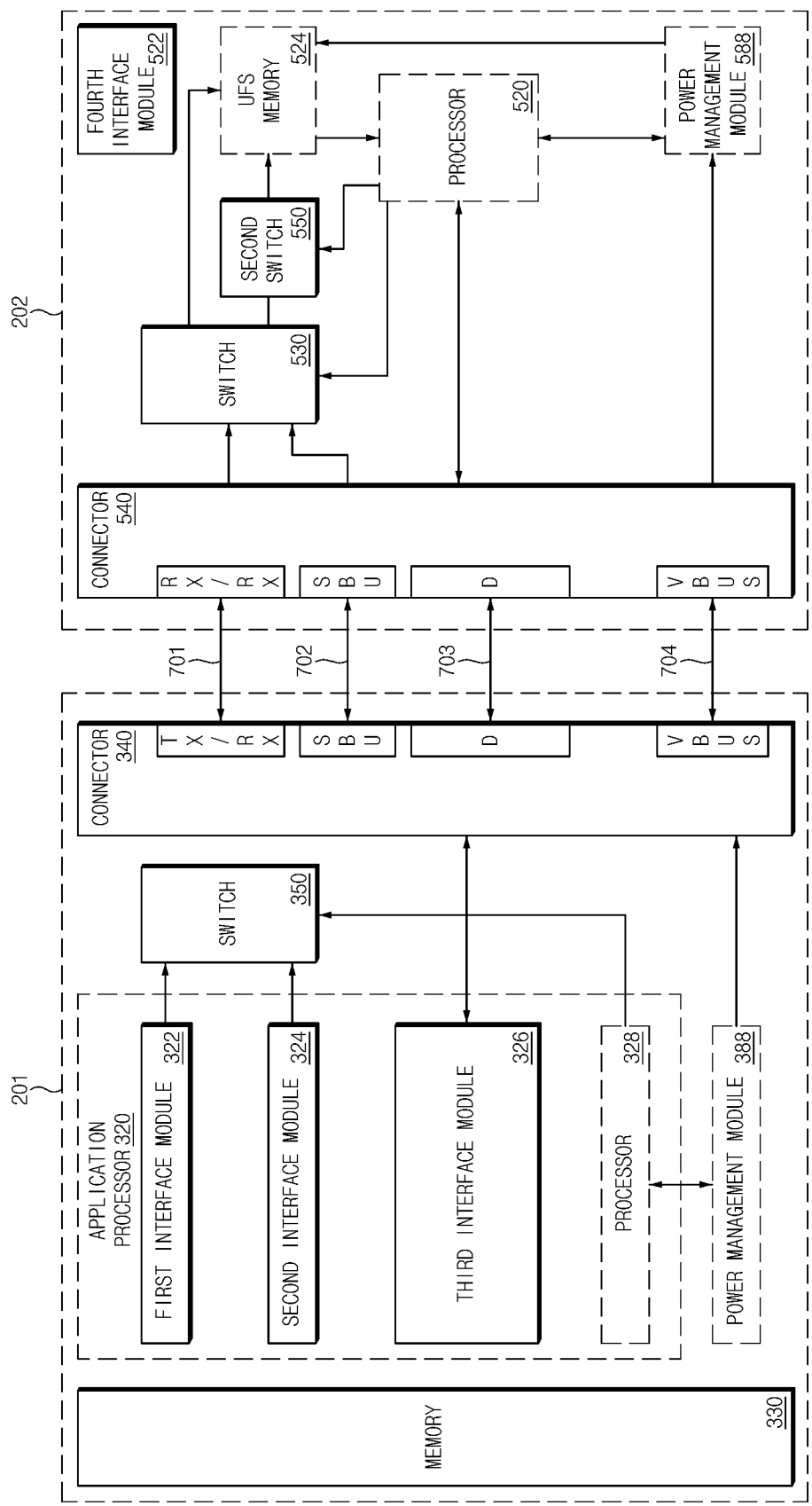
FIG. 7 illustrates signal flows inside an electronic device and a docking device when a UFS memory is inserted in the docking device according to various embodiments.

FIG. 7 illustrates signal flows inside an electronic device and a docking device when a UFS memory is inserted in the docking device according to various embodiments.

Referring to FIG. 7, the first electronic device 201 and the docking device 202 may be physically connected with each other through the connector 340 of the first electronic device 201 and the connector 540 of the docking device 202. Each of the connectors may be a USB C-TYPE receptacle or a plug. In FIG. 7, it may be assumed that the first interface module 322 is connected to the connector 340 in the first electronic device 201 and the fourth interface module 522 is connected to the connector 540 in the docking device 202.

According to an embodiment, in the docking device 202, the processor 520 may detect that the UFS memory 524 is added. For example, the processor 520 may receive the CD signal from the UFS memory 524. When the addition of the UFS memory 524 is detected, the processor 520 (or a USB PHY included in the processor 520) may transmit the first signal requesting the change of the interface module using the USB 2.0 protocol. The first signal may be transmitted through a third signal flow path 703 indicating a signal flow between the D+/− pins of the connector 340 and the connector 540.

According to an embodiment, in the first electronic device 201, the processor 328 may receive the first signal through the third interface module 326. The processor 328 may control the switch 350 to change the interface module connected to the connector 340 from the first interface module 322 to the second interface module 324. For another example, when the first electronic device 201 does not include the switch 350, the processor 328 may float a signal flow of the first interface module 322 and activate a signal flow of the second interface module 324 within the application processor 320. The processor 328 may transmit the first response signal indicating that the interface module is switched. For example, the processor 328 may control the third interface module 326 such that the first response signal is transmitted through the third signal flow path 703 using the USB 2.0 protocol.

According to an embodiment, in the docking device 202, the processor 520 may receive the first response signal and switch the interface module connected to the connector 540. For example, the processor 520 may control the switch 530 to change the interface module connected to the connector 540 from the fourth interface module 522 to the UFS memory 524 (or the interface module included in the UFS memory 524).

According to an embodiment, when the first electronic device 201 further includes the power management module 388, the processor 328 may control the power management module 388 to supply the power to the power management module 588 of the docking device 202. For example, the processor 328 may transmit the control signal to the power management module 388 through the I2C or the GPIO. The power may be supplied through a fourth signal flow path 704 indicating a signal flow between the VBUS pins of the connector 340 and the connector 540.

According to an embodiment, in the docking device 202, the processor 520 may control the power management module 588 to apply the power to the UFS memory 588. For example, the processor 520 may transmit the control signal to the power management module 588 through the I2C or the GPIO. When the power is applied to the UFS memory 524, the processor 520 may transmit the re-response signal indicating that the interface module has been switched through the third signal flow path 703.

According to an embodiment, in the first electronic device 201, the processor 328 may control the second interface module 324 to transmit a signal (e.g., a RST signal or a CLK signal) for initializing the UFS memory. The signal for initializing the UFS memory may be transmitted through a second signal flow path 702 indicating a signal flow between the SBU1/2 pins of the connector 340 and the connector 540.

According to an embodiment, in the first electronic device 201, the processor 328 may detect that directions of the SBU1 and the SBU2 are changed. For example, the processor 328 may identify the directions of the SBU1 and the SBU2 based on insertion directions of the CC1, the CC2, the CC, and the VCONN. When the directions of the SBU1 and the SBU2 are changed, the processor 328 may control the third interface module 326 to transmit the second signal requesting the change the SBU lane using the USB 2.0 protocol. The second signal may be transmitted through the third signal flow path 703.

According to an embodiment, in the docking device 202, the processor 520 may control a second switch 550 to change the SBU lane connected between the UFS memory 524 and the connector 540. When the SBU lane is changed, the processor 520 may transmit the second response signal in response to the second signal using the USB 2.0 protocol. For example, the second response signal may be transmitted through the third signal flow path 703. When the second response signal is received in the first electronic device 201, the processor 328 may control the second interface module 324 to transmit the RST signal or the CLK signal through the second signal flow path 702.

According to an embodiment, in the first electronic device 201, the processor 328 may control the second interface module 324 to transmit the video or audio data using the UFS protocol. For example, the video or audio data may be transmitted through a first signal flow path 701 indicating a signal flow between the TX/RX pins of the connector 340 and the connector 540.

FIG. 8 illustrates an operation flowchart of an electronic device switching an interface module connected to a connector according to various embodiments. Each of operations to be described below may be implemented by the first electronic device 201, or by the processor 328 when the instructions stored in the memory 330 of the first electronic device 201 are executed.

Referring to FIG. 8, in operation 805 of a method 800, the processor 328 may control the switch 350 such that the first interface module 322 supporting the DP protocol (or the USB 3.x protocol) is connected to the connector 340. According to an embodiment, the switch 350 may be an analog switch located between the first interface module 322 and the connector 340, or may be a digital switch implemented inside the application processor 320. According to an embodiment, the connector 340 may be the USB C-TYPE defined by the USB standard organization. When the connector 340 is the USB C-TYPE, the first interface module 322 may be connected to the connector 340 through one of the TX1+/− lane and the TX2+/− lane and one of the RX1+/− lane and the RX2+/− lane.

In operation 810, the processor 328 may receive the first signal requesting the change of the interface module from the docking device 202 through the third interface module 326. According to an embodiment, the first signal may be transmitted through the USB 2.0 protocol.

In operation 815, the processor 328 may control the switch 350 such that the second interface module 324 supporting the UFS protocol is connected to the connector 340. According to an embodiment, when the connector 340 is the USB C-TYPE, the second interface module 324 may be connected to the connector 340 through one of the TX1+/− lane and the TX2+/− lane and one of the RX1+/− lane and the RX2+/− lane.

Figure 9:
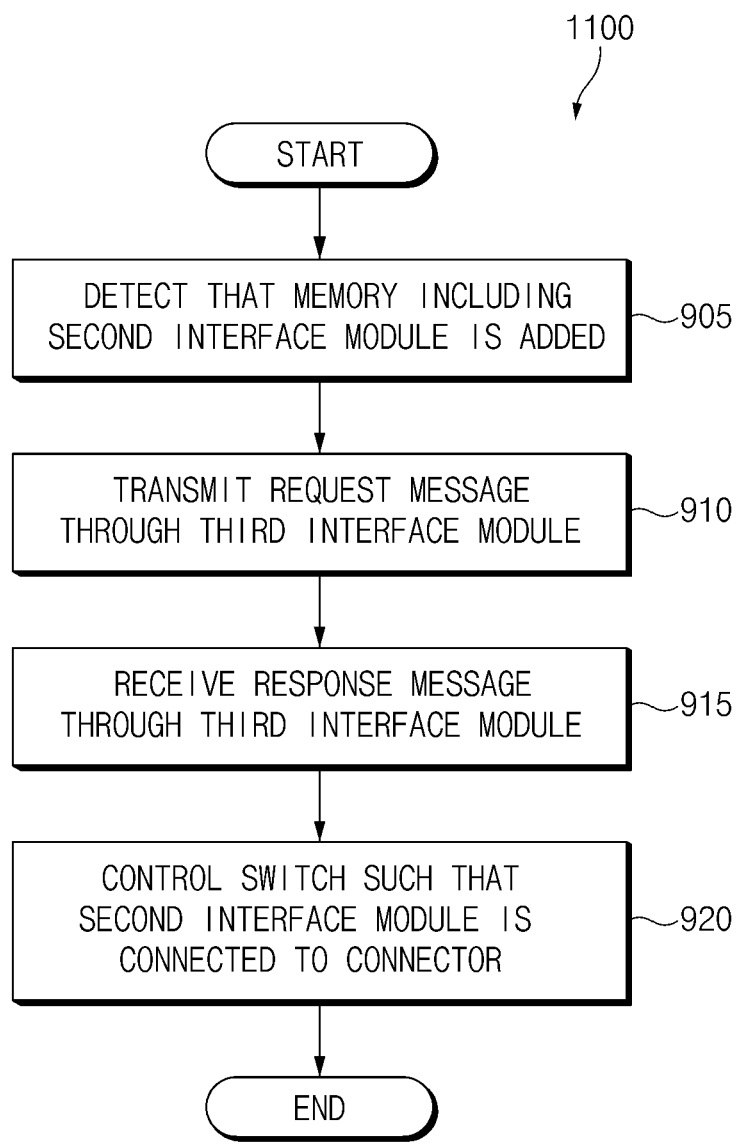
FIG. 9 illustrates an operation flowchart of a docking device switching an interface module connected to a connector according to various embodiments.

FIG. 9 illustrates an operation flowchart of a docking device switching an interface module connected to a connector according to various embodiments. Each of operations to be described below may be implemented by the docking device 202 or the processor 520.

Referring to FIG. 9, in operation 905 of a method 900, the processor 520 may detect that the memory (that is, a UFS memory 624) including the second interface module supporting the UFS protocol is added in the docking device 202. According to an embodiment, the UFS memory 524 may be inserted in the form of the card or embedded in the docking device 202.

In operation 910, the processor 520 may transmit the first signal requesting the change of the interface module to the first electronic device 201 through the third interface module supporting the USB 2.0 protocol. The third interface module may be imbedded in the processor 520 or may be separately located in the docking device 202. In operation 915, the processor 520 may receive the first response signal in response to the first signal from the first electronic device 201 through the third interface module.

In operation 920, the processor 520 may control the switch 530 such that the second interface module included in the UFS memory 524 is connected to the connector 540.

According to an embodiment, when the UFS memory 524 is added in the docking device 201, the first electronic device 201 may recognize the UFS memory (e.g., the memory 330 of FIG. 3) included in the first electronic device 201 and the UFS memory 524 of the docking device 201 as a single UFS memory. The first electronic device 201 may boot a plurality of operating systems by partitioning the single recognized UFS memory.

Figure 10:
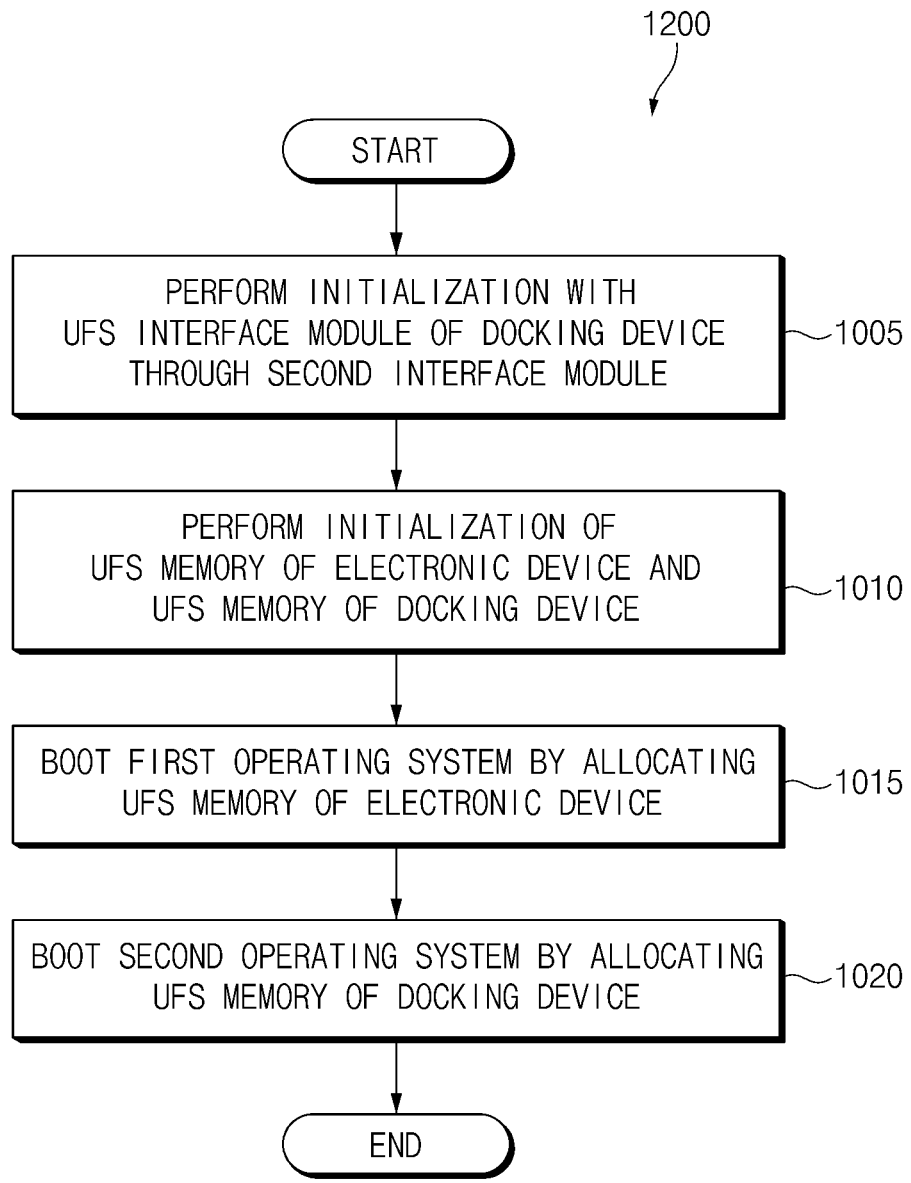
FIG. 10 illustrates an operation flowchart of an electronic device booting a plurality of operating systems using a UFS memory according to various embodiments.

FIG. 10 illustrates an operation flowchart of an electronic device booting a plurality of operating systems using a UFS memory according to various embodiments. Each of operations to be described below may be implemented by the first electronic device 201, or by the processor 328 when the instructions stored in the memory 330 of the first electronic device 201 are executed.

Referring to FIG. 10, in operation 1005 of a method 1000, the processor 328 may perform interface initialization with the UFS interface module of the docking device 202 through the second interface module 324.

In operation 1010, the processor 328 may initialize the UFS memory of the first electronic device 210 and the UFS memory 524 of the docking device 202, and recognize the UFS memory of the first electronic device 210 and the UFS memory 524 of the docking device 202 as a single UFS memory.

In operation 1015, the processor 328 may boot a first operating system by allocating a portion of the UFS memory. For example, the processor 328 may load a boot loader of the first operating system allocated to the portion of the UFS memory, and may boot the first operating system based on the boot loader.

In operation 1020, the processor 328 may boot a second operating system by allocating another portion of the UFS memory. For example, the processor 328 may load a boot loader of the second operating system allocated to another portion of the UFS memory, and may boot the second operating system based on the boot loader.

Through the above method 1000, the first electronic device 201 may provide a plurality of service environments to a user by booting the plurality of operating systems. For example, the first electronic device 201 may provide a secured system environment through the second operating system or provide a dedicated system environment of a specific company (or a school).

Figure 11:
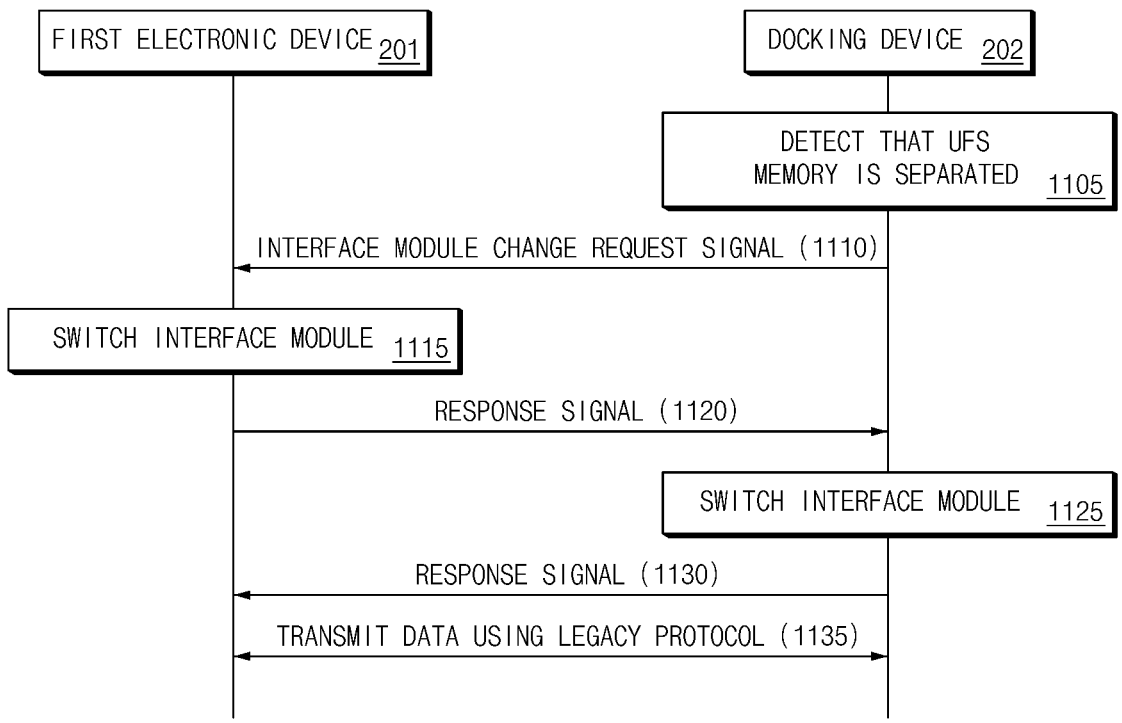
FIG. 11 illustrates a signal flow diagram between an electronic device and a docking device when a UFS memory is separated from the docking device according to various embodiments.

FIG. 11 illustrates a signal flow diagram between an electronic device and a docking device when a UFS memory is separated from the docking device according to various embodiments.

Referring to FIG. 11, in operation 1105, the docking device 202 may detect that the UFS memory 524 is separated from the docking device 202.

In operation 1110, the docking device 202 may transmit a third signal requesting a change of the interface module to the first electronic device 201. For example, the docking device 202 may request to change the interface module from the interface module supporting the UFS protocol to the interface module supporting the legacy protocol. According to an embodiment, the docking device 202 may transmit the third signal through the USB 2.0 protocol.

In operation 1115, the first electronic device 201 may switch the interface module. For example, the first electronic device 201 may switch the interface module from the second interface module 324 supporting the UFS protocol to the first interface module 322 supporting the legacy protocol. According to an embodiment, the first electronic device 201 may change the interface module by controlling the switch 350 located between the application processor 320 and the connector 340. According to an embodiment, the first electronic device 201 may change the interface module by controlling the digital signal inside the application processor 320.

In operation 1120, the first electronic device 201 may transmit a third response signal in response to the third signal. For example, the first electronic device 201 may transmit the third response signal using the USB 2.0 protocol.

In operation 1125, the docking device 202 may switch the interface module. For example, the docking device 202 may control the switch 530 such that the fourth interface module 522 supporting the legacy protocol is connected to the connector 540.

In operation 1130, the docking device 202 may transmit the re-response signal indicating that the interface module has been switched to the first electronic device 201. For example, the docking device 202 may transmit the re-response signal using the USB 2.0 protocol. In operation 1135, the first electronic device 201 and the docking device 202 may perform the data transmission using the legacy protocol.

A signal flow order illustrated in FIG. 11 is only an example, and the scope of the disclosure is not limited to the order illustrated in FIG. 11. For example, the first electronic device 201 may preferentially deactivate the second interface module 324 in response to the third signal and transmit a response signal to the docking device 202. The first electronic device 201 may switch the interface module after receiving a re-response signal from the docking device 202. In this case, the first electronic device 201 may transmit a signal indicating that the interface module has been switched to the docking device 202. For another example, when the interface module of the first electronic device 201 is switched, the docking device 202 may deactivate the power management module 588 of the docking device 202 and then transmit a signal indicating that the power management module 588 is deactivated to the first electronic device 201.

Figure 12:
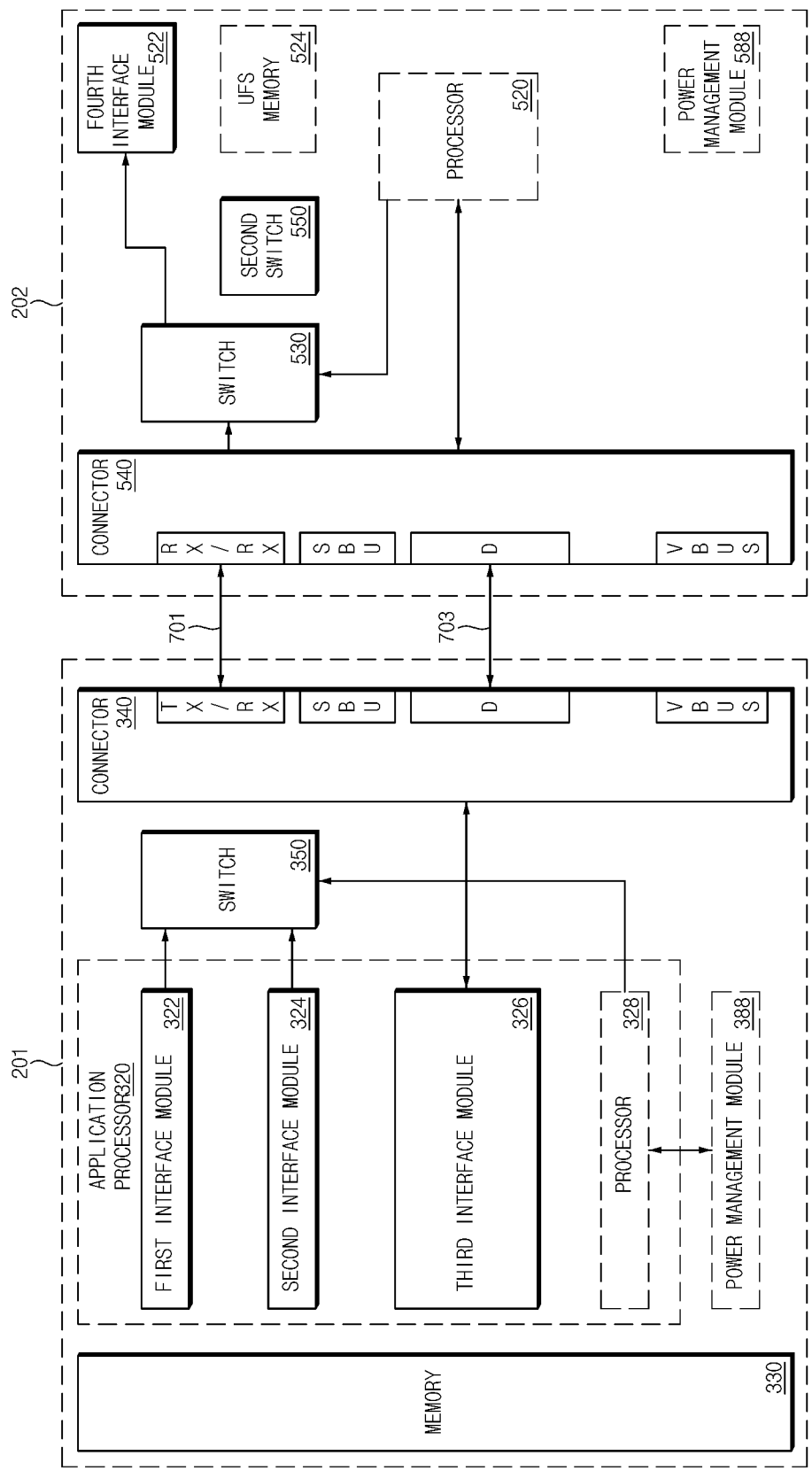
FIG. 12 illustrates signal flows inside an electronic device and a docking device when a UFS memory is separated from the docking device according to various embodiments.

FIG. 12 illustrates signal flows inside an electronic device and a docking device when a UFS memory is separated from the docking device according to various embodiments.

According to an embodiment, in the docking device 202, the processor 520 may detect that the UFS memory 524 is separated from the docking device 202. For example, the processor 520 may detect that the UFS memory 524 is separated through the CD signal. When the separation of the UFS memory 524 is detected, the processor 520 (or the USB PHY included in the processor 520) may transmit the third signal requesting the change of the interface module using the USB 2.0 protocol. The third signal may be transmitted through the third signal flow path 703.

According to an embodiment, in the first electronic device 201, the processor 328 may receive the third signal through the third interface module 326. The processor 328 may control the switch 350 to change the interface module connected to the connector 340 from the second interface module 324 to the first interface module 322. In another example, the processor 328 may deactivate the second interface module 324 in the application processor 320, and activate the signal flow of the first interface module 322. The processor 328 may transmit the third response signal indicating that the interface module has been switched or indicating that the second interface module 324 is deactivated. For example, the processor 328 may control the third interface module 326 such that the third response signal is transmitted through the third signal flow path 703 using the USB 2.0 protocol.

According to an embodiment, in the docking device 202, the processor 520 may receive the third response signal and switch the interface module connected to the connector 540. For example, the processor 520 may control the switch 530 to change the interface module connected to the connector 540 to the fourth interface module 522. According to an embodiment, the processor 520 may deactivate the power application of the power management module 588. For example, the processor 520 may transmit the control signal to the power management module 588 through the I2C or the GPIO. When the power supply of the power management module 588 is deactivated, the processor 520 may transmit the re-response signal indicating that the interface module has been switched through the third signal flow path 703.

According to an embodiment, in the first electronic device 201, the processor 328 may control the first interface module 322 to transmit the video or audio data using the legacy protocol. For example, the video or audio data may be transmitted through the first signal flow path 701.

As described above, an electronic device (e.g., the electronic device 101 of FIG. 1 or the first electronic device 210 of FIG. 2) may include a connector (e.g., the connector 340 of FIG. 3) that is connected to a docking device (e.g., the docking device 202 of FIG. 2), a first interface module (e.g., the first interface module 322 of FIG. 3) supporting a display port protocol, a second interface module (e.g., the second interface module 324 of FIG. 3) supporting a UFS protocol, a third interface module (e.g., the third interface module 326 of FIG. 3) supporting a USB protocol, a switch (e.g., the switch 350 of FIG. 3) located between the connector and the first interface module and the second interface module, a processor (e.g., the processor 328 of FIG. 3) that controls the switch, and a memory (e.g., the memory 330 of FIG. 3) electrically connected to the processor, wherein the memory stores instructions that, when executed by the processor, may cause the processor to control the switch such that the first interface module is connected to the connector, receive a first signal requesting a change of an interface module from the docking device through the third interface module, and control the switch such that the second interface module is connected to the connector. According to an embodiment, the connector may include a USB C-TYPE.

According to an embodiment, the electronic device may further include a power management module (e.g., the power management module 388 of FIG. 3), wherein the instructions that, when executed by the processor, may cause the processor to transmit a first response signal in response to the first signal to the docking device through the third interface module, control the power management module to supply power to the docking device through the connector, and perform data transmission with the docking device through the second interface module.

According to an embodiment, the second interface module and the connector may be connected with each other through one of a TX1+/− lane and a TX2+/− lane and one of a RX1+/− lane and a RX2+/− lane of the USB C-TYPE.

According to an embodiment, a SBU1 lane and a SBU2 lane of the USB C-TYPE may be further included between the second interface module and the connector, wherein the instructions that, when executed by the processor, may cause the processor to perform an initialization process of the second interface module through one of the SBU1 lane and the SBU2 lane.

According to an embodiment, the instructions that, when executed by the processor, may cause the processor to detect that an insertion direction of the connector is changed, transmit a second signal indicating that the insertion direction of the connector is changed to the docking device through the third interface module, receive a second response signal in response to the second signal from the docking device through the third interface module, and perform the initialization process of the second interface module through one lane determined based on the changed insertion direction of the connector among the SBU1 lane and the SBU2 lane.

According to an embodiment, the instructions that, when executed by the processor, may cause the processor to perform an initialization process of the memory of the electronic device and a memory of the docking device, boot a first operating system by allocating the memory of the electronic device, and boot a second operating system by allocating the memory of the docking device.

According to an embodiment, the instructions that, when executed by the processor, may cause the processor to receive a third signal indicating that the second interface module is deactivated from the docking device through the third interface module, control the switch such that the first interface module is connected to the connector, transmit a third response signal in response to the third signal to the docking device through the third interface module, and perform data transmission with the docking device through the first interface module.

As described above, a docking device (e.g., the docking device 202 of FIG. 2) may include a connector (e.g., the connector 540 of FIG. 5) that is connected to an electronic device, a first interface module (e.g., the fourth interface module 522 of FIG. 5) supporting a DP protocol, a processor (e.g., the processor 520 of FIG. 5), and a switch (e.g., the switch 530 of FIG. 5) located between the first interface module and the connector, wherein the processor may detect that a memory (e.g., the UFS memory 524 of FIG. 5) including a UFS interface module is inserted into the docking device, transmit a first signal requesting a change of an interface module of the electronic device, receive a first response signal in response to the first signal from the electronic device, and control the switch such that the UFS interface module is connected to the connector. According to an embodiment, the connector may include a USB C-TYPE.

According to an embodiment, the docking device may further include a power management module (e.g., the power management module 588 of FIG. 5), wherein the processor may receive power from the electronic device, transmit the received power to the UFS interface module, and perform data transmission with the electronic device through the UFS interface module.

According to an embodiment, the UFS interface module and the connector may be connected with each other through one of a TX1+/− lane and a TX2+/− lane and one of a RX1+/− lane and a RX2+/− lane of the USB C-TYPE.

According to an embodiment, the docking device may further include a SBU1 lane and a SBU2 lane of the USB C-TYPE between the UFS interface module and the connector, wherein the processor may perform an initialization process of the UFS interface module through one of the SBU1 lane and the SBU2 lane.

According to an embodiment, the docking device may further include a second switch (e.g., the second switch 550 of FIG. 7) between the UFS interface module and the connector, wherein the processor may receive a second signal indicating that an insertion direction of the connector is changed from the electronic device, control the second switch to select one lane based on the changed insertion direction of the connector among the SBU1 lane and the SBU2 lane, transmit a second response signal in response to the second signal to the electronic device, and perform the initialization process of the UFS interface module through one lane determined among the SBU1 lane and the SBU2 lane.

According to an embodiment, the processor may detect that the memory is separated from the docking device, transmit a third signal indicating that the UFS interface module is deactivated to the electronic device, receive a third response signal in response to the third signal from the electronic device, and perform data transmission with the electronic device through the first interface module.

As described above, an electronic device (e.g., the electronic device 101 of FIG. 1 or the first electronic device 201 of FIG. 2) may include a USB connector (e.g., the connector 340 of FIG. 3) that is connected to a docking device (e.g., the docking device 202 of FIG. 2) and includes a USB C-TYPE, a first interface module (e.g., the first interface module 322 of FIG. 3) supporting a DP protocol, a second interface module (e.g., the second interface module 324 of FIG. 3) supporting a UFS protocol, a third interface module (e.g., the third interface module 326 of FIG. 3) supporting a USB protocol, a switch (e.g., the switch 350 of FIG. 3) located between the connector and the first interface module and the second interface module, a processor (e.g., the processor 328 of FIG. 3) that controls the switch, and a memory (e.g., the memory 330 of FIG. 3) electrically connected to the processor, wherein the memory stores instructions that, when executed by the processor, may cause the processor to control the switch such that the first interface module is connected to the USB connector, receive a first signal requesting a change of an interface module from the docking device through the third interface module, and control the switch such that the second interface module is connected to the USB connector.

According to an embodiment, the electronic device may further include a power management module (e.g., the power management module 388 of FIG. 3), wherein the instructions that, when executed by the processor, may cause the processor to transmit a first response signal in response to the first signal to the docking device through the third interface module, control the power management module to supply power to the docking device through the USB connector, and perform data transmission with the docking device through the second interface module.

According to an embodiment, the second interface module and the USB connector may be connected with each other through one of a TX1+/− lane and a TX2+/− lane and one of a RX1+/− lane and a RX2+/− lane of the USB C-TYPE.

According to an embodiment, the electronic device may further include a SBU1 lane and a SBU2 lane of the USB C-TYPE between the second interface module and the USB connector, and the instructions that, when executed by the processor, cause the processor to perform an initialization process of the second interface module through one of the SBU1 lane and the SBU2 lane.

According to an embodiment, the instructions that, when executed by the processor, cause the processor to detect that an insertion direction of the USB connector is changed, transmit a second signal indicating that the insertion direction of the USB connector is changed to the docking device through the third interface module, receive a second response signal in response to the second signal from the docking device through the third interface module, and perform the initialization process of the second interface module through one lane determined based on the changed insertion direction of the USB connector among the SBU1 lane and the SBU2 lane.

The electronic device according to various embodiments disclosed in the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a connector configured to be connected to a docking device;
   a first lane and a second lane associated with data transmission based on a high-speed;
   a third lane associated with data transmission based on a low-speed;
   a first interface module supporting a display port (DP) protocol and configured to be connected to the connector through the first lane;
   a second interface module supporting a universal flash storage (UFS) protocol and configured to be connected to the connector through the second lane;
   a third interface module supporting a universal serial bus (USB) protocol and configured to be connected to the connector through the third lane;
   a power management module;
   a switch located between the connector and the first interface module and the second interface module;
   a processor configured to control the switch and the power management module; and
   a memory electrically connected to the processor, wherein the memory stores instructions that, when executed by the processor, cause the processor to:
      in response to detecting that the docking device is connected to the connector, control the switch such that the first interface module is connected to the connector and perform data transmission with the docking device through the first lane; and
      in response to detecting that a first signal indicating that an addition memory including a UFS interface module is inserted into the connected docking device is received through the third interface module, control the power management module to supply power to the addition memory through the connector, and control the switch such that the second interface module is connected to the connector and perform the data transmission with the addition memory through the second lane,
   wherein the instructions, when the first signal is determined by the processor, cause the processor to:
      determine whether an insertion direction of a connector of the docking device is changed,
      in response to determining that the insertion direction of the connector of the docking device is changed, transmit a second signal requesting a change of a SBU lane to the docking device through the third interface module so that the docking device changes the SBU lane connected between the addition memory and the connector of the docking device.

2. The electronic device of claim 1, wherein the connector includes a USB C-TYPE.

3. The electronic device of claim 2, wherein the first lane comprises one of a TX1+/− lane and a RX1+/− lane of the USB C-TYPE or a TX2+/− lane and a RX2+/− lane of the USB C-TYPE and the second lane comprises the other one of the TX1+/− lane and the RX1+/− lane of the USB C-TYPE or the TX2+/− lane and the RX2+/− lane of the USB C-TYPE.

4. The electronic device of claim 1, further comprising:
   wherein the instructions, when executed by the processor, cause the processor to:
      receive, through the third interface module, a second response signal indicating that the SBU lane has been switched in response to the second signal from the docking device; and
      perform an initialization process of the addition memory and perform the data transmission with the addition memory through the second lane.

5. The electronic device of claim 4, wherein the instructions, when executed by the processor, cause the processor to:
   perform an initialization process of the memory of the electronic device and a memory of the docking device and recognize the memory of the electronic device and the memory of the docking device as a single memory;
   boot a first operating system by allocating a portion of the single memory; and
   boot a second operating system by allocating another portion of the single memory.

6. The electronic device of claim 1,
   wherein the instructions, when executed by the processor, cause the processor to:
      receive, from the docking device, a third signal indicating that the addition memory including the UFS interface module is separated from the docking device through the third interface module;
      control the switch such that the first interface module is connected to the connector;
      transmit a third response signal in response to the third signal to the docking device through the third interface module; and
      perform data transmission with the docking device through the first lane.

7. A docking device comprising:
   a connector configured to be connected to an electronic device;
   a first interface module supporting a DP protocol and configured to be connected to the connector through a first lane;
   a power management module;
   a processor; and
   a switch located between the first interface module and the connector,
   wherein the processor is configured to:
      in response to detecting that the electronic device is connected to the connector, control the switch such that the first interface module is connected to the connector and perform data transmission with the electronic device through the first interface module;
      detect that an addition memory including a UFS interface module is inserted into the docking device while the first interface module is connected to the connector;
      transmit a first signal indicating that the addition memory is inserted into the docking device to the electronic device;
      receive a first response signal in response to the first signal from the electronic device; and
      control the switch such that the UFS interface module is connected to the connector and perform the data transmission with the electronic device through the UFS interface module,
   wherein the processor is further configured to:
      receive power from the electronic device and transmit the received power to the addition memory; and when a second signal requesting a change of an SBU lane is received from the electronic device, change the SBU lane connected between the addition memory and the connector.

8. The docking device of claim 7, wherein the connector includes a USB C-TYPE.

9. The docking device of claim 8, wherein the UFS interface module and the connector are connected with each other through one of a TX1+/− lane and a TX2+/− lane and one of a RX1+/− lane and a RX2+/− lane of the USB C-TYPE.

10. The docking device of claim 7, wherein the SBU lane comprises a SBU1 lane and a SBU2 lane between the UFS interface module and the connector, and the docking device further comprises:
 a second switch between the UFS interface module and the connector,
 wherein the processor is configured to:
  in response to receiving the second signal, control the second switch to select one lane based on a changed insertion direction of the connector among the SBU1 lane and the SBU2 lane;
  transmit a second response signal indicating that the SBU lane has been switched in response to the second signal to the electronic device; and
  perform an initialization process of the addition memory and perform the data transmission with the electronic device through the UFS interface module.

11. The docking device of claim 7, wherein the processor is configured to:
 detect that the addition memory is separated from the docking device;
 transmit, to the electronic device, a third signal indicating that the addition memory including the UFS interface module is separated;
 receive a third response signal in response to the third signal from the electronic device; and
 perform data transmission with the electronic device through the first interface module.

12. The docking device of claim 10, wherein the first signal, the first response signal, the second signal, and the second response signal are transmitted through a D+/− lane of a USB C-TYPE.

13. The electronic device of claim 2, wherein the third lane comprises a D+/− lane of the USB C-TYPE.

14. The docking device of claim 11, wherein the third signal and the third response signal are transmitted through a D+/− lane of a USB C-TYPE.

* * * * *